(12) United States Patent
Chiou et al.

(10) Patent No.: US 8,730,340 B2
(45) Date of Patent: May 20, 2014

(54) APPARATUS AND MEHOD FOR PROCESSING WIDE DYNAMIC RANGE IMAGE

(75) Inventors: Bor-Wen Chiou, Yangmei (TW); Wun-Young Leo, Hukou Township, Hsinchu County (TW)

(73) Assignee: WT Microelectronics Co., Ltd., Taipei (TW)

(*) Notice: Subject to any disclaimer, the term of this patent is extended or adjusted under 35 U.S.C. 154(b) by 437 days.

(21) Appl. No.: 13/286,571

(22) Filed: Nov. 1, 2011

(65) Prior Publication Data
US 2012/0169906 A1    Jul. 5, 2012

(30) Foreign Application Priority Data
Dec. 31, 2010 (TW) ............................... 99147336 A

(51) Int. Cl.
*H04N 5/228* (2006.01)
*H04N 5/235* (2006.01)
*G06K 9/40* (2006.01)

(52) U.S. Cl.
USPC ................ 348/222.1; 348/221.1; 348/229.1; 382/254; 382/274

(58) Field of Classification Search
USPC ........ 348/207.99, 216.1, 220.1, 221.1, 222.1, 348/229.1, 230.1, 241, 250, 251, 254, 255, 348/257, 362; 382/162, 167, 254, 270, 271, 382/272, 273, 274, 275, 276, 307
See application file for complete search history.

(56) References Cited

U.S. PATENT DOCUMENTS 4,496,985 A * 1/1985 Jensen et al. ............... 378/98.12
6,278,496 B1 * 8/2001 Kitagawa et al. ............ 348/674
(Continued)

OTHER PUBLICATIONS

Reinhard, E., et al.; "Photographic Tone Reproduction for Digital Images," pp. 1-10.

(Continued)

*Primary Examiner* — Twyler Haskins
*Assistant Examiner* — Peter Chon
(74) *Attorney, Agent, or Firm* — McClure, Qualey & Rodack, LLP

(57) ABSTRACT

Apparatus and method for processing wide dynamic range (WDR) image are disclosed. The WDR image processing apparatus could be integrated within an image sensor or an image backend apparatus. Whether the m-th bit of the sensing image signal is equal to 1 is determined. If the m-th bit is equal to 1, then the values corresponding to the m-th to the (m−r)-th bits are added by first offset to output a WDR image signal. If the m-th bit is not equal to 1, then whether the (m−1)-th bit is equal to 1 is determined. If the (m−1)-th bit is equal to 1, then the values corresponding to the (m−1)-th to the (m−s)-th bits are added by a second offset to output the WDR image signal. The same processing is applied up to the (m−t)-th bit, m, n, r, s and t are positive integers, and m is greater than n.

22 Claims, 4 Drawing Sheets

(56) References Cited

U.S. PATENT DOCUMENTS

| | | | |
|---|---|---|---|
| 6,552,591 | B1 | 4/2003 | Abadi et al. |
| 6,922,209 | B1 * | 7/2005 | Hwang et al. ............ 348/229.1 |
| 7,433,514 | B2 | 10/2008 | Sloan |
| 7,684,645 | B2 | 3/2010 | Vitsnudel et al. |
| 8,289,412 | B2 * | 10/2012 | Banterle et al. ............ 348/222.1 |
| 2003/0103677 | A1 | 6/2003 | Tastl et al. |
| 2004/0207734 | A1 | 10/2004 | Horiuchi |
| 2009/0041376 | A1 | 2/2009 | Carletta et al. |
| 2009/0102945 | A1 | 4/2009 | Chen |
| 2009/0268963 | A1 | 10/2009 | Kang et al. |

OTHER PUBLICATIONS

Fattal, R., et al.; "Gradient Domain High Dynamic Range Compression;" pp. 1-8.

Cohen, J., et al.; "Real-Time High Dynamic Range Texture Mapping;" pp. 1-9.

DiCarlo, J.M., et al.; "Rendering High Dynamic Range Images;" pp. 1-10.

Krawczyk, G., et al.; "Perceptual Effects in Real-Tiem Tone Mapping;" pp. 1-8.

* cited by examiner

APPARATUS AND METHOD FOR PROCESSING WIDE DYNAMIC RANGE IMAGE

This application claims the benefit of Taiwan application Serial No. 99147336, filed Dec. 31, 2010, the subject matter of which is incorporated herein by reference.

BACKGROUND OF THE INVENTION

1. Field of the Invention

The invention relates in general to an image processing apparatus, and more particularly to an apparatus and a method for processing a wide dynamic range (WDR) image.

2. Description of the Related Art

Referring to FIG. 1, a schematic diagram of a conventional image processing system is shown. The conventional image processing system 1 comprises an image sensor 10 and an image backend apparatus 20. The image sensor 10 is for providing a sensing image signal S1 to the image backend apparatus 20, which further processes the sensing image signal S1. The image backend apparatus 20 requires the use of more complicated hardware and needs to perform complicated formula computation in order to convert the sensing image signal S1 into a wide dynamic range (WDR) image signal. For example, the conventional practice requires a frame buffer for storing the data of an entire frame, and the image backend apparatus 20 further performs a large amount of complicated computation according to the data of the entire frame so as to convert the sensing image signal S1 into a WDR image signal. The conventional practice, which requires the use of more complicated hardware and needs to perform complicated formula computation, is incapable of processing high-resolution dynamic image signal in a real-time manner. Another conventional practice, which does not require a frame buffer to store the data of an entire frame but still requires the use of complicated hardware and needs to perform complicated formula computation, is still incapable of processing high-resolution dynamic image signal in a real-time manner.

SUMMARY OF THE INVENTION

The invention is directed to an apparatus and a method for processing a wide dynamic range (WDR) image.

According to one embodiment of the present invention, a wide dynamic range (WDR) image processing apparatus is provided. The WDR image processing apparatus comprises a sensor interface, a backend interface, a WDR image processing engine and a control circuit. The sensor interface is for coupling the image sensor. The backend interface is for coupling the image backend apparatus. The WDR image processing engine is for electrically connecting the sensor interface and the backend interface, and outputting an n-bit WDR image signal to the backend interface according to an m-bit sensing image signal. The sensing image signal comprises a first bit to an m-th bit in continuity, wherein the first bit to the m-th bit are binary coded. The WDR image processing engine determines whether the value of the m-th bit is equal to 1. If the value of the m-th bit is equal to 1, then the values corresponding to the m-th bit to the (m−r)-th bit are added by a first offset to output a WDR image signal. If the value of the m-th bit is not equal to 1, then whether the value of the (m−1)-th bit is equal to 1 is determined. If the value of the (m−1)-th bit is equal to 1, then the values corresponding to the (m−1)-th bit to the (m−s)-th bit are added by a second offset to output a WDR image signal. The control circuit controls the sensor interface, the backend interface and the WDR image processing engine. The same processing is applied up to the (m−t)-th bit. Wherein, m, n, r, s and t are positive integers, and m is greater than n.

According to another embodiment of the present invention, a wide dynamic range (WDR) image processing method is provided. According to the WDR image processing method, the m-bit sensing image signal is converted into an n-bit WDR image signal and outputted to the image backend apparatus, wherein m is greater than n. The sensing image signal comprises a first bit to an m-th bit in continuity, wherein the first bit to the m-th bit are binary coded. The WDR image processing method comprises the following steps: Whether the m-th bit of the sensing image signal is equal to 1 is determined. If the m-th bit is equal to 1, then the values corresponding to the m-th bit to the (m−r)-th bit are added by a first offset to output a WDR image signal. If the m-th bit is not equal to 1, then whether the (m−1)-th bit is equal to 1 is determined. If the (m−1)-th bit is equal to 1, then the values corresponding to the (m−1)-th bit to the (m−s)-th bit are added by a second offset to output a WDR image signal. The same processing is applied up to the (m−t)-th bit. Wherein, m, n, r, s and t are positive integers, and m is greater than n.

The above and other aspects of the invention will become better understood with regard to the following detailed description of the preferred but non-limiting embodiment(s). The following description is made with reference to the accompanying drawings.

DETAILED DESCRIPTION OF THE INVENTION

First Embodiment

Figure 1:
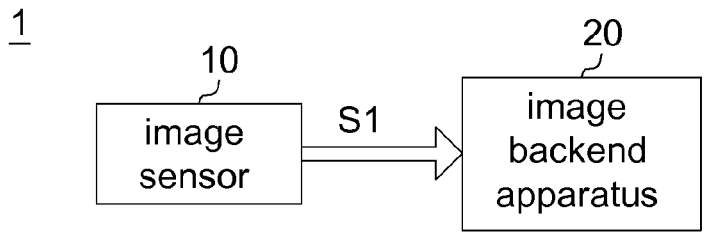
FIG. 1 shows a schematic diagram of a conventional image processing system.
Figure 2:
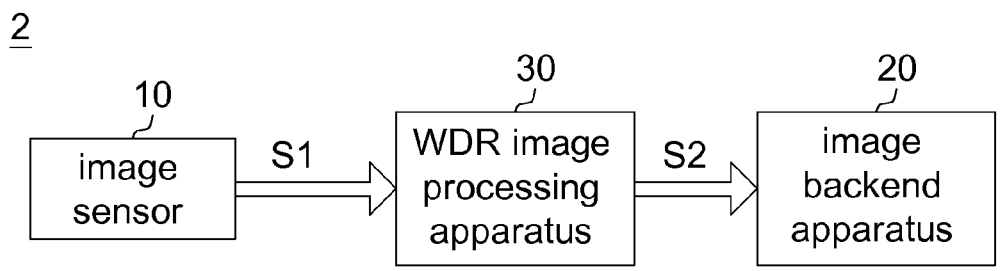
FIG. 2 shows a schematic diagram of an image processing system according to a first embodiment of the invention.

Referring to FIG. 2, a schematic diagram of an image processing system according to a first embodiment of the invention is shown. The image processing system 2 comprises an image sensor 10, an image backend apparatus 20 and a wide dynamic range (WDR) image processing apparatus 30. The image backend apparatus 20 can be realized by any apparatuses capable of processing image data, and examples of the image backend apparatus 20 include digital signal processor (DSP), microprocessor, application specific standard product (ASSP) or interface card which can provide related image backend processing.

The WDR image processing apparatus 30 is serially connected between the image sensor 10 and the image backend processing apparatus 20 for converting a sensing image signal S1 captured by the image sensor 10 into a WDR image signal S2 and further outputting the WDR image signal S2 to the image backend apparatus 20. The WDR image processing apparatus 30, which can be independently formed by an IC Chip or a hardware apparatus such as a bridge, is disposed between the image sensor 10 and the image backend apparatus 20. The WDR image signal S2 outputted by the WDR image processing apparatus 30 can be further processed for the use of the image backend apparatus 20.

The role of the WDR image processing apparatus 30 is similar to a bridge. The WDR image processing apparatus 30, serially connected between the image sensor 10 and the image backend apparatus 20 in the form of a bridge, can independently perform wide dynamic range (WDR) image processing without using the resources of the central processing unit (CPU) within the image backend apparatus 20.

The WDR image processing apparatus 30 is like a dummy image backend apparatus 20 to the image sensor 10. On the other hand, the image backend apparatus 20 is like a dummy image sensor 10 to the WDR image processing apparatus 30. Virtually, no apparatuses exists between the image sensor 10 and the image backend apparatus 20, so the transmission of image data between the image sensor 10 and the image backend apparatus 20 is free of obstacle and has excellent efficiency.

The image processing system 2 completes WDR processing of image data transmission through the WDR image processing apparatus 30. Therefore, such structure achieves excellent WDR image processing without jeopardizing the overall efficiency of the image processing system 2.

Second Embodiment

Figure 3:
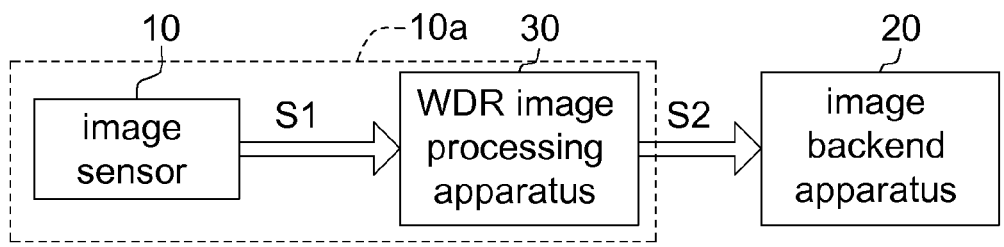
FIG. 3 shows a schematic diagram of an image processing system according to a second embodiment of the invention.

Referring to FIG. 3, a schematic diagram of an image processing system according to a second embodiment of the invention is shown. The WDR image processing apparatus 30 can be further formed as an IC Chip, and the WDR image processing apparatus 30 can be integrated with the image sensor 10 to form an image sensor 10a. Since the WDR image processing apparatus 30 is serially connected to the front end of the predetermined outward transmission interface of the image sensor 10a, there is no need to change the design of the control chip of the image sensor 10a, and a WDR processing for transmitting image data can be performed between the image sensor 10a and the image backend apparatus 20.

Third Embodiment

Figure 4:
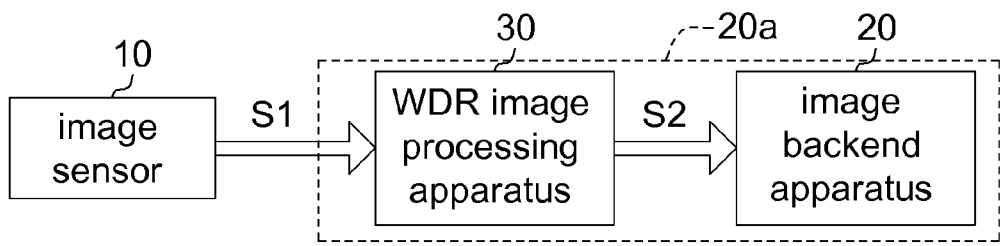
FIG. 4 shows a schematic diagram of an image processing system according to a second embodiment of the invention.

Referring to FIG. 4, a schematic diagram of an image processing system according to a second embodiment of the invention is shown. The WDR image processing apparatus 30 can be further formed as an IC Chip, and the WDR image processing apparatus 30 can be integrated with the image backend apparatus 20 to form an image backend apparatus 20a. Since the WDR image processing apparatus 30 is serially connected to the front end of the predetermined outward transmission interface of the image backend apparatus 20, a WDR processing for transmitting image data can be performed between the image sensor 10 and the image backend apparatus 20a.

As indicated in FIG. 2, FIG. 3 and FIG. 4, the invention can be implemented with several variations. The WDR image processing apparatus 30 can be independently formed as an IC Chip or a hardware apparatus such as a bridge. In addition, the WDR image processing apparatus 30 can also be directly disposed inside the image sensor 10a or the image backend apparatus 20a.

Figure 5:
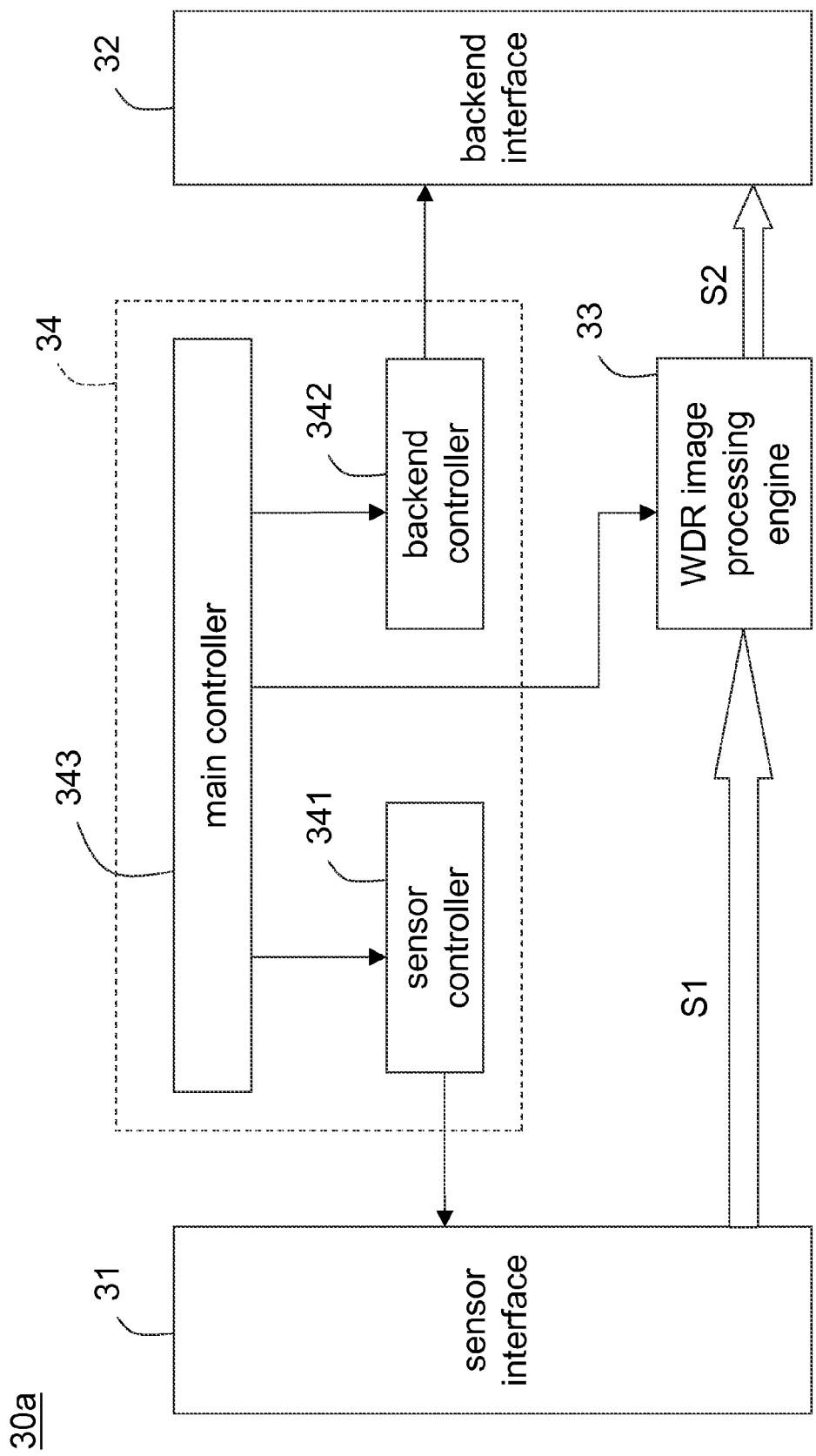
FIG. 5 shows a schematic diagram of a first-type WDR image processing apparatus.

Referring to FIG. 5, a schematic diagram of a first-type WDR image processing apparatus is shown. In FIG. 5, the WDR image processing apparatus 30 is designated as a WDR image processing apparatus 30a which comprises a sensor interface 31, a backend interface 32, a WDR image processing engine 33 and a control circuit 34. The sensor interface 31 is for coupling an image sensor and receiving an m-bit sensing image signal S1 from the image sensor 10. The sensor interface 31 further outputs the sensing image signal S1 to the WDR image processing engine 33. The WDR image processing engine 33 outputs an n-bit WDR image signal S2 to the backend interface 32 according to the sensing image signal S1. Wherein, m and n are positive integers, and m is greater than n. The sensing image signal S1 is transmitted to the WDR image processing engine 33 in serial or parallel. The backend interface 32 is for coupling the image backend apparatus, and outputting the WDR image signal S2 to the image backend apparatus. The WDR image signal S2 is such as transmitted to backend interface 32 in serial or parallel.

The WDR image processing engine 33 is for electrically connecting the sensor interface 31 and the backend interface 32. The WDR image processing engine 33 is realized by a hardware circuit such as a field programmable gate array (FPGA) or an application specific integrated circuit (ASIC) connected in serial or parallel. Furthermore, the WDR image processing engine 33 can also be realized by a digital signal processor (DSP), a central processing unit (CPU) or a microprocessor.

The control circuit 34 is for controlling the sensor interface 31, the backend interface 32 and the WDR image processing engine 33. Furthermore, the control circuit 34 comprises a sensor controller 341, a backend controller 342 and a main controller 343. The sensor controller 341 is for controlling the sensor interface 31. The backend controller 342 is for controlling the backend interface 32. The main controller 343 is for controlling the sensor controller 341, the backend controller 342 and the WDR image processing engine 33.

TABLE 1

| Bits | Binary representation of sensing image signal: | Hexadecimal representation of WDR image signal: |
| --- | --- | --- |
| [15:6] | 1111 1111 11xx xxxx$_2$~1000 0000 00xx xxxx$_2$ | FFF$_{16}$~E00$_{16}$ = (3FF$_{16}$~200$_{16}$) + C00$_{16}$ |
| [14:5] | 0111 1111 111x xxxx$_2$~0100 0000 000x xxxx$_2$ | DFF$_{16}$~C00$_{16}$ = (3FF$_{16}$~200$_{16}$) + A00$_{16}$ |
| [13:4] | 0011 1111 1111 xxxx$_2$~0010 0000 0000 xxxx$_2$ | BFF$_{16}$~A00$_{16}$ = (3FF$_{16}$~200$_{16}$) + 800$_{16}$ |
| [12:3] | 0001 1111 1111 1xxx$_2$~0001 0000 0000 0xxx$_2$ | 9FF$_{16}$~800$_{16}$ = (3FF$_{16}$~200$_{16}$) + 600$_{16}$ |
| [11:2] | 0000 1111 1111 11xx$_2$~0000 1000 0000 00xx$_2$ | 7FF$_{16}$~600$_{16}$ = (3FF$_{16}$~200$_{16}$) + 400$_{16}$ |
| [10:1] | 0000 0111 1111 111x$_2$~0000 0100 0000 000x$_2$ | 5FF$_{16}$~400$_{16}$ = (3FF$_{16}$~200$_{16}$) + 200$_{16}$ |
| [9:0] | 0000 0011 1111 1111$_2$~0000 0000 0000 0000$_2$ | 3FF$_{16}$~000$_{16}$ = (3FF$_{16}$~000$_{16}$) + 000$_{16}$ |

Figure 6:
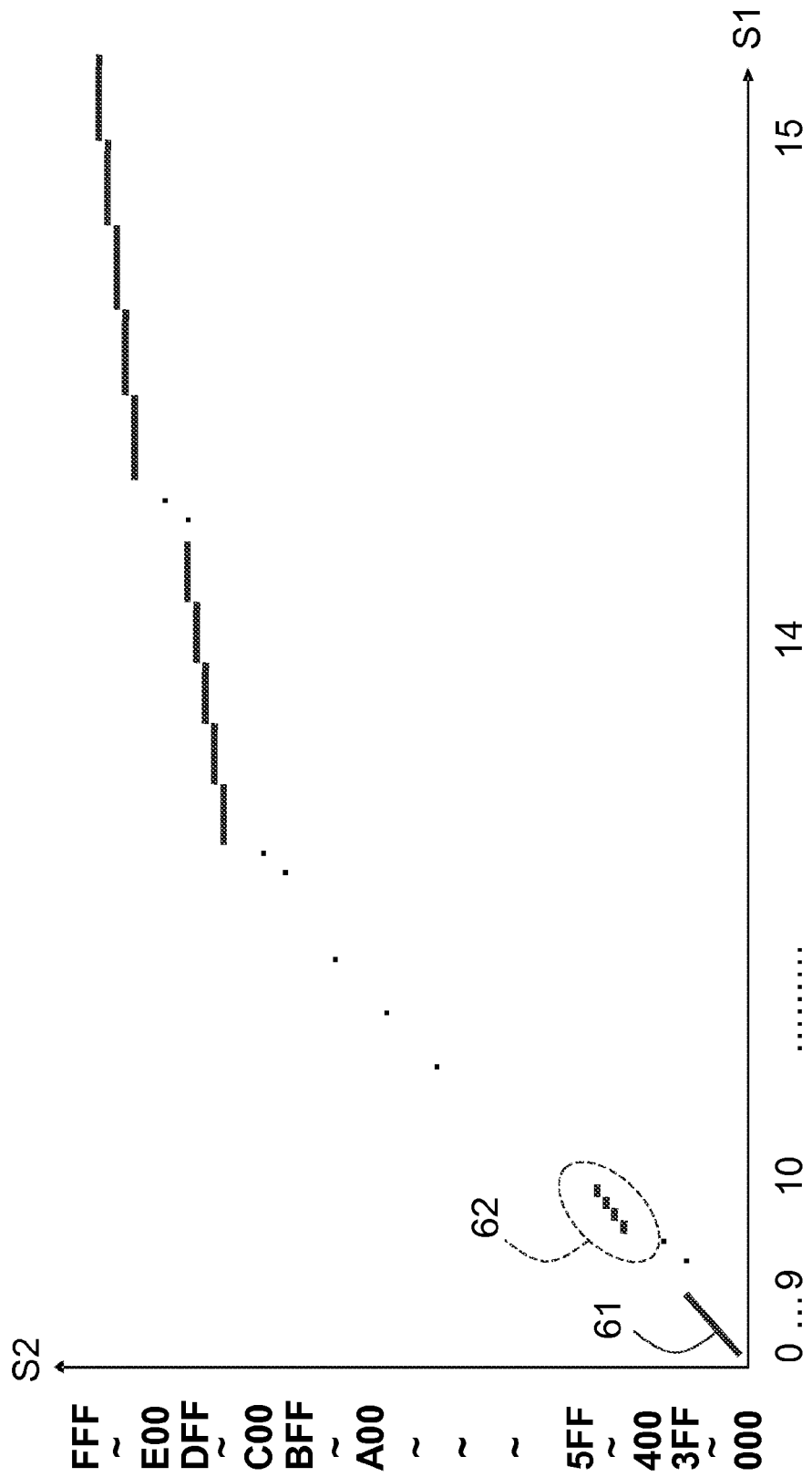
FIG. 6 shows a schematic diagram of a mapping relationship between a sensing image signal and a WDR image signal.

Referring to both FIG. 6 and Table 1. FIG. 6 shows a schematic diagram of a mapping relationship between a sensing image signal and a WDR image signal. Table 1 shows a mapping relationship between binary representation and hexadecimal representation. The horizontal axis of FIG. 6 is the sensing image signal S1 represented by its bit number. For example, the horizontal axis of FIG. 6 designated by 15 is binary coded as 1111 1111 1111 1111$_2$.

The sensing image signal S1 and the WDR image signal S2 form a progressive step non-linear mapping. The progressive step non-linear mapping formed by the sensing image signal S1 and the WDR image signal S2 at least comprises two mapping ranges: one mapping range is p-to-1 and the other mapping range is q-to-1, wherein, p and q are positive integers, and p is not equal to q. As indicated in FIG. 6, the mapping range 61 is 1-to-1, that is, one sensing image signal S1 corresponds to one WDR image signal S2. The mapping range 62 is 2-to-1, that is, two sensing image signals S1 correspond to one WDR image signal S2. In practical application, the number of mapping ranges can be adjusted according to actual needs.

In general, human eyes are more sensitive to the change in brightness when brightness level low than when brightness level is high. Therefore, the mapping range corresponding to low brightness can be designed in the manner that one sensing image signal S1 corresponds to one WDR image signal S2 or two sensing image signals S1 correspond to one WDR image signal S2, and the mapping range corresponding to high brightness can be designed as eight sensing image signals S1 correspond to one WDR image signal S2 or sixteen sensing image signals S1 correspond to one WDR image signal S2. In other words, the mapping relationship of the mapping range can be flexibly adjusted according to the characteristics of human eyes.

Let m and n be equal to 16 and 12 respectively. In the mapping range 61, each sensing image signal S1 has a corresponding WDR image signal S2. For example, the WDR image signal S2 corresponds to $000_{16}$ if the sensing image signal S1 is equal to 0000 0000 0000 $0000_2$, and the WDR image signal S2 corresponds to $001_{16}$ if the sensing image signal S1 is equal to 0000 0000 0000 $0001_2$. By the same analogy, the WDR image signal S2 corresponds to $3FF_{16}$ if the sensing image signal S1 is equal to 0000 0011 1111 $1111_2$. Therefore, the WDR image signal S2 corresponds to $3FF_{16} \sim 000_{16}$ if the sensing image signal S1 is equal to 0000 0011 1111 $1111_2 \sim$ 0000 0000 0000 $0000_2$.

In the mapping range 62, every two sensing image signals S1 have a corresponding WDR image signal S2. For example, the WDR image signal S2 corresponds to $400_{16}$ if the sensing image signal S1 is equal to 0000 0100 0000 $0000_2$ and 0000 0100 0000 $0001_2$, and the WDR image signal S2 corresponds to $401_{16}$ if the sensing image signal S1 is equal to 0000 0100 0000 $0010_2$ and 0000 0100 0000 $0011_2$. By the same analogy, the WDR image signal S2 corresponds to $5FF_{16}$ if the sensing image signal S1 is equal to 0000 0111 1111 $1110_2$ and 0000 0111 1111 $1111_2$. Therefore, if the sensing image signal S1 is equal to 0000 0111 1111 $111x_2 \sim$ 0000 0100 0000 $000x_2$, then the WDR image signal S2 corresponds to $5FF_{16} \sim 400_{16}$, $5FF_{16} \sim 400_{16}$ is equal to $(3FF_{16} \sim 200_{16}) + 200_{16}$, and the $200_{16}$ added to the $(3FF_{16} \sim 200_{16})$ is an offset.

By the same analogy, if the sensing image signal S1 is equal to 0000 1111 1111 $11xx_2 \sim$ 0000 1000 0000 $00xx_2$, then the WDR image signal S2 corresponds to $7FF_{16} \sim 600_{16}$, $7FF_{16} \sim 600_{16}$ is equal to $(3FF_{16} \sim 200_{16}) + 400_{16}$, and the $400_{16}$ added to the $(3FF_{16} \sim 200_{16})$ is an "offset". If the sensing image signal S1 is equal to 0001 1111 1111 $1xxx_2 \sim$ 0001 0000 0000 $0xxx_2$, then the WDR image signal S2 corresponds to $9FF_{16} \sim 800_{16}$, $9FF_{16} \sim 800_{16}$ is equal to $(3FF_{16} \sim 200_{16}) + 600_{16}$, and the $600_{16}$ added to $(3FF_{16} \sim 200_{16})$ is an offset. If the sensing image signal S1 is equal to 0011 1111 1111 $xxxx_2 \sim$ 0010 0000 0000 $xxxx_2$, then the WDR image signal S2 corresponds to $BFF_{16} \sim A00_{16}$, $BFF_{16} \sim A00_{16}$ is equal to $(3FF_{16} \sim 200_{16}) + 800_{16}$, and the $800_{16}$ added to $(3FF_{16} \sim 200_{16})$ is an offset. If the sensing image signal S1 is equal to 0111 1111 111x $xxxx_2 \sim$ 0100 0000 000x $xxxx_2$, then the WDR image signal S2 corresponds to $DFF_{16} \sim C00_{16}$, $DFF_{16} \sim C00_{16}$ is equal to $(3FF_{16} \sim 200_{16}) + A00_{16}$, and the $A00_{16}$ added to $(3FF_{16} \sim 200_{16})$ is an offset. If the sensing image signal S1 is equal to 1111 1111 11xx $xxxx_2 \sim$ 1000 0000 00xx $xxxx_2$, then the WDR image signal S2 corresponds to $FFF_{16} \sim E00_{16}$, $FFF_{16} \sim E00_{16}$ is equal to $(3FF_{16} \sim 200_{16}) + C00_{16}$, and the $C00_{16}$ added to $(3FF_{16} \sim 200_{16})$ is an offset. It can be concluded that the WDR image processing engine 33 can promptly output a corresponding WDR image signal S2 by adding corresponding offsets to corresponding values of partial bits of the sensing image signal S1. The subsequent programs executed by the WDR image processing engine 33 can be deduced from the above descriptions.

The sensing image signal S1 comprises a first bit to an m-th bit in continuity, wherein the m-th bit is a most significant bit (MSB) and the first bit is a least significant bit (LSB). The first bit to the m-th bit are binary coded. The WDR image processing engine 33 determines whether the value of the m-th bit is equal to 1, wherein 1 denotes logic 1 for example. If the value of the m-th bit is equal to 1, then the values corresponding to the m-th bit to the (m−r)-th bit are added by an offset and is outputted. If the value of the m-th bit is not equal to 1, then the WDR image processing engine 33 determines whether the value of the (m−1)-th bit is equal to 1. If the value of the (m−1)-th bit is equal to 1, then the values corresponding to the (m−1)-th bit to the (m−s)-th bit are added by another offset and outputted. By the same analogy, whether the subsequent (m−2)-th bit to the (m−t)-th bit is equal to 1 is determined to output a corresponding WDR image signal. Wherein, r, s and t are positive integers.

For example, the WDR image processing engine 33 executes the following program to output a WDR image signal S2 according to the sensing image signal S1:

If bit [15] !=0
   Out=the value of [15:6]+12'hC00 (Hexadecimal representation of $3072_{10}$)
Else if bit [14] !=0
   Out=the value of [14:5]+12'hA00 (Hexadecimal representation of $2560_{10}$)
Else if bit [13] !=0
   Out=the value of [13:4]+12'h800 (Hexadecimal representation of $2048_{10}$)
Else if bit [12] !=0
   Out=the value of [12:3]+12'h600 (Hexadecimal representation of $1536_{10}$)
Else if bit [11] !=0
   Out=the value of [11:2]+12'h400 (Hexadecimal representation of $1024_{10}$)
Else if bit [10] !=0
   Out=the value of [10:1]+12'h200 (Hexadecimal representation of $512_{10}$)
Else
   Out=the value of [9:0]

The sensing image signal S1 comprises a first bit to an m-th bit, which are exemplified by bit 0 to bit 15 in one embodiment. The WDR image processing engine 33 determines whether the value of bit 15 is equal to 1. If yes, then the values corresponding to bits [15:6] of the sensing image signal S1 are added by an offset $C00_{16}$ to output a WDR image signal S2. To the contrary, if the value of bit 15 is not equal to 1, then the WDR image processing engine 33 determines whether the value of bit 14 is equal to 1. If the value of bit 14 is equal to 1, then the values corresponding to bits [14:5] are added by an offset $A00_{16}$ to output a WDR image signal S2.

If the value of bit 14 is not equal to 1, then the WDR image processing engine 33 determines whether the value of bit 13 is equal to 1. If the value of bit 13 is equal to 1, then the values corresponding to bits [13:4] are added by an offset $800_{16}$ to output a WDR image signal S2. If the value of bit 13 is not equal to 1, then the WDR image processing engine 33 determines whether the value of bit 12 is equal to 1. If the value of bit 12 is equal to 1, then the values corresponding to bits [12:3] are added by an offset $600_{16}$ to output a WDR image signal S2.

If the value of bit 12 is not equal to 1, then the WDR image processing engine 33 determines whether the value of bit 11 is equal to 1. If the value of bit 11 is equal to 1, then the values corresponding to bits [11:2] are added by an offset $400_{16}$ to output a WDR image signal S2. If the value of bit 11 is not equal to 1, then the WDR image processing engine 33 determines whether the value of bit 10 is equal to 1. If the value of bit 10 is equal to 1, then the values corresponding to bits [10:1] are added by an offset $200_{16}$ to output a WDR image signal S2. If the value of bit 10 is not equal to 1, then the WDR image processing engine 33 outputs bits [9:0] as a WDR image signal S2. Despite the upper limit of the sensing image signal S1 is exemplified by $FFF_{16}$ in the above embodiments, the invention isn't limited thereto. In practical application, the upper limit of the sensing image signal S1 can also be smaller than $FFF_{16}$. For example, the upper limit is $E00_{16}$.

As disclosed above, the WDR image processing engine 33 is capable of promptly converting a sensing image signal S1 into a WDR image signal S2 without performing a large amount of computation, and there is no need to employ expensive and powerful processor. Besides, despite the sensing image signal S1 is a high-resolution dynamic image signal, the WDR image processing engine 33, being capable of promptly converting a sensing image signal S1 into a WDR image signal S2, can process the dynamic image signal, hence largely increasing product competiveness.

Figure 7:
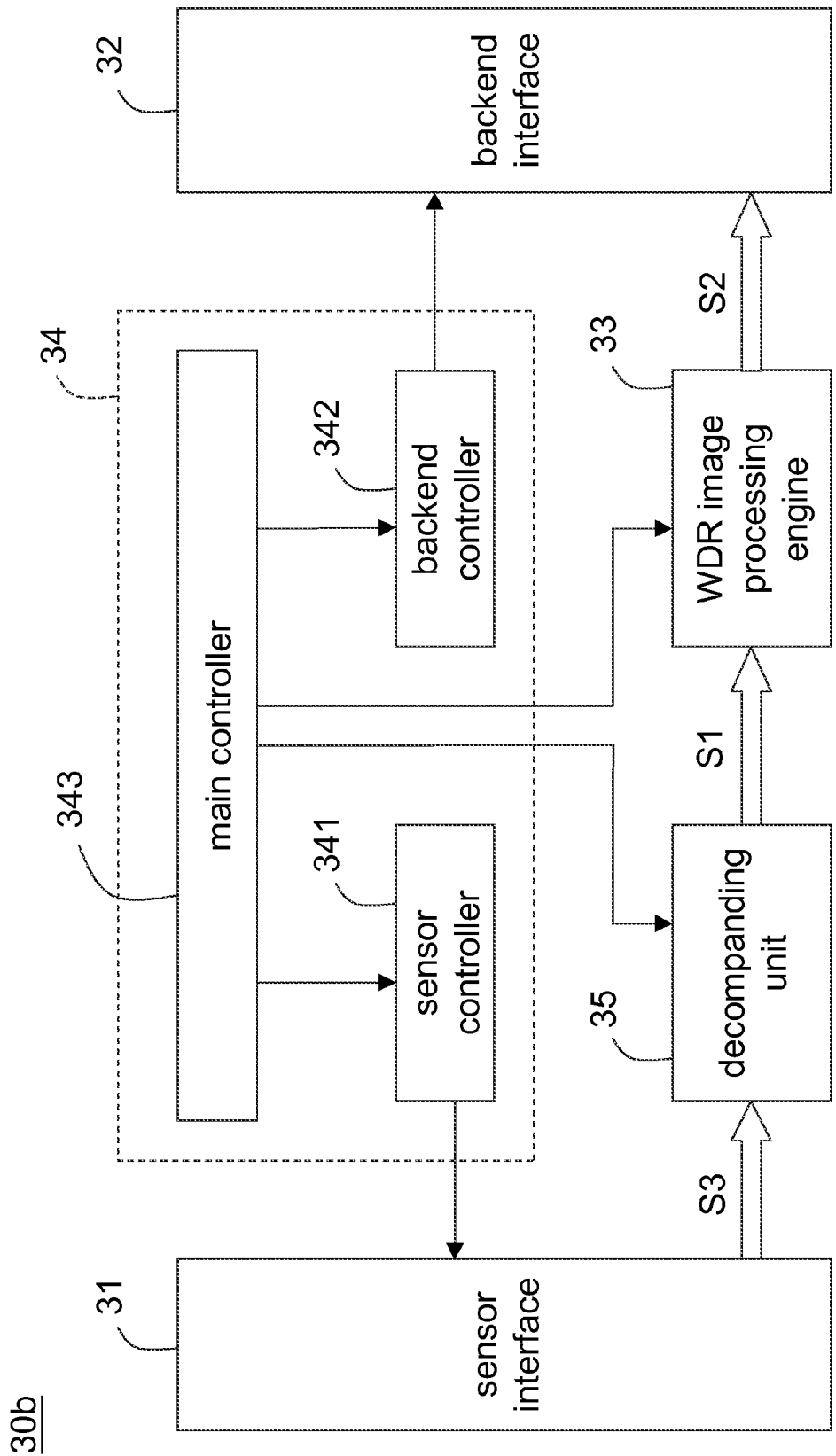
FIG. 7 shows a schematic diagram of a second-type WDR image processing apparatus.

Referring to FIG. 7, a schematic diagram of a second-type WDR image processing apparatus is shown. The WDR image processing apparatus 30b is different from the WDR image processing apparatus 30a mainly in that the WDR image processing apparatus 30b further comprises a decompanding unit 35. Of various image sensors, some image sensors may compand the sensing image signal as a k-bit companding image signal S3 and then output the companded signal to the sensor interface 31, wherein, k is a positive integer. Therefore, after the sensor interface 31 outputs a companding image signal S3 to the decompanding unit 35, the decompanding unit 35 decompands the companding image signal S3 as a sensing image signal S1. Then, the WDR image processing engine 33 further converts the sensing image signal S1 into a WDR image signal S2.

While the invention has been described by way of example and in terms of the preferred embodiment (s), it is to be understood that the invention is not limited thereto. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A wide dynamic range (WDR) image processing apparatus, comprising:
    a sensor interface for coupling an image sensor;
    a backend interface for coupling an image backend apparatus;
    a WDR image processing engine for electrically connecting the sensor interface and the backend interface, and outputting an n-bit WDR image signal to the backend interface according to an m-bit sensing image signal, wherein the sensing image signal comprises a first bit to an m-th bit in continuity, the WDR image processing engine determines whether the value of the m-th bit is equal to 1, if the value of the m-th bit is equal to 1, then the values corresponding to the m-th bit to an (m−r)-th bit are added by a first offset to output a WDR image signal, and if the value of the m-th bit is not equal to 1, then whether the value of an (m−1)-th bit is equal to 1 is determined, if the value of the (m−1)-th bit is equal to 1, then the values corresponding to the (m−1)-th bit to an (m−s)-th bit are added by a second offset to output the WDR image signal; and
    a control circuit for controlling the sensor interface, the backend interface and the WDR image processing engine;
    wherein, m, n, r and s are positive integers, and m is greater than n.

2. The WDR image processing apparatus according to claim 1, wherein the m-th bit is a most significant bit (MSB) and the first bit is a least significant bit (LSB).

3. The WDR image processing apparatus according to claim 1, wherein the sensing image signal and the WDR image signal form a progressive step non-linear mapping.

4. The WDR image processing apparatus according to claim 3, wherein the progressive step non-linear mapping at least comprises a first mapping range and a second mapping range, the first mapping range is p-to-1, and the second mapping range is q-to-1;
    wherein, p and q are positive integers, and p is not equal to q.

5. The WDR image processing apparatus according to claim 1, wherein the sensor interface is for outputting the sensing image signal to the WDR image processing engine.

6. The WDR image processing apparatus according to claim 1, further comprising:
    a decompanding unit for decompanding a companding image signal into the sensing image signal, wherein the sensor interface is for outputting the companding image signal to the decompanding unit.

7. The WDR image processing apparatus according to claim 1, wherein the control circuit comprises:
    a sensor controller for controlling the sensor interface;
    a backend controller for controlling the backend interface;
    a main controller for controlling the sensor controller, the backend controller and the WDR image processing engine.

8. The WDR image processing apparatus according to claim 1, wherein the WDR image processing apparatus is integrated within the image sensor.

9. The WDR image processing apparatus according to claim 1, wherein the WDR image processing apparatus is integrated within the image backend apparatus.

10. The WDR image processing apparatus according to claim 1, wherein the sensing image signal is transmitted to the WDR image processing engine in serial.

11. The WDR image processing apparatus according to claim 1, wherein the sensing image signal is transmitted to the WDR image processing engine in parallel.

12. The WDR image processing apparatus according to claim 1, wherein the WDR image signal is transmitted to the backend interface in serial.

13. The WDR image processing apparatus according to claim 1, wherein the WDR image signal is transmitted to the backend interface in parallel.

14. A wide dynamic range (WDR) image processing method for converting a m-bit sensing image signal into an n-bit WDR image signal and outputting the WDR image signal to an image backend apparatus, m is greater than n, the sensing image signal comprises a first bit to a m-th bit in continuity, and the WDR image processing method comprises the following steps:

determining whether the value of the m-th bit is equal to 1;

adding a first offset to the values corresponding to the m-th bit to an (m−r)-th bit to output a WDR image signal if the value of the m-th bit is equal to 1;

determining whether the value of an (m−1)-th bit is equal to 1 if the value of the m-th bit is not equal to 1; and adding a second offset to the values corresponding to the (m−1)-th bit to an (m−s)-th bit to output the WDR image signal if the value of the (m−1)-th bit is equal to 1;

wherein, m, n, r and s are positive integers, and m is greater than n.

15. The WDR image processing method according to claim 14, wherein the m-th bit is a most significant bit (MSB) and the first bit is a least significant bit (LSB).

16. The WDR image processing method according to claim 14, wherein the sensing image signal and the WDR image signal form a progressive step non-linear mapping.

17. The WDR image processing method according to claim 16, wherein the progressive step non-linear mapping at least comprises a first mapping range and a second mapping range, the first mapping range is p-to-1, and the second mapping range is q-to-1;

wherein, p and q are positive integers, and p is not equal to q.

18. The WDR image processing method according to claim 14, further comprising:

decompanding a companding image signal into the sensing image signal.

19. The WDR image processing method according to claim 14, wherein the sensing image signal is transmitted to a WDR image processing engine in serial.

20. The WDR image processing method according to claim 14, wherein the sensing image signal is transmitted to a WDR image processing engine in parallel.

21. The WDR image processing method according to claim 14, wherein the WDR image signal is transmitted to a back-end interface in serial.

22. The WDR image processing method according to claim 14, wherein the WDR image signal is transmitted to a back-end interface in parallel.

* * * * *

UNITED STATES PATENT AND TRADEMARK OFFICE
CERTIFICATE OF CORRECTION

PATENT NO. : 8,730,340 B2
APPLICATION NO. : 13/286571
DATED : May 20, 2014
INVENTOR(S) : Chiou et al.

It is certified that error appears in the above-identified patent and that said Letters Patent is hereby corrected as shown below:

On the Title Page, title, please replace "Apparatus and Mehod for Processing Wide Dynamic Range Image" with "Apparatus and Method for Processing Wide Dynamic Range Image"

Signed and Sealed this
Fifth Day of August, 2014

Michelle K. Lee
*Deputy Director of the United States Patent and Trademark Office*